Sept. 25, 1951 E. S. MACKEY 2,568,894
4-BENZOYLRESORCINOL AS AN ULTRAVIOLET ABSORBENT
Filed Sept. 15, 1949
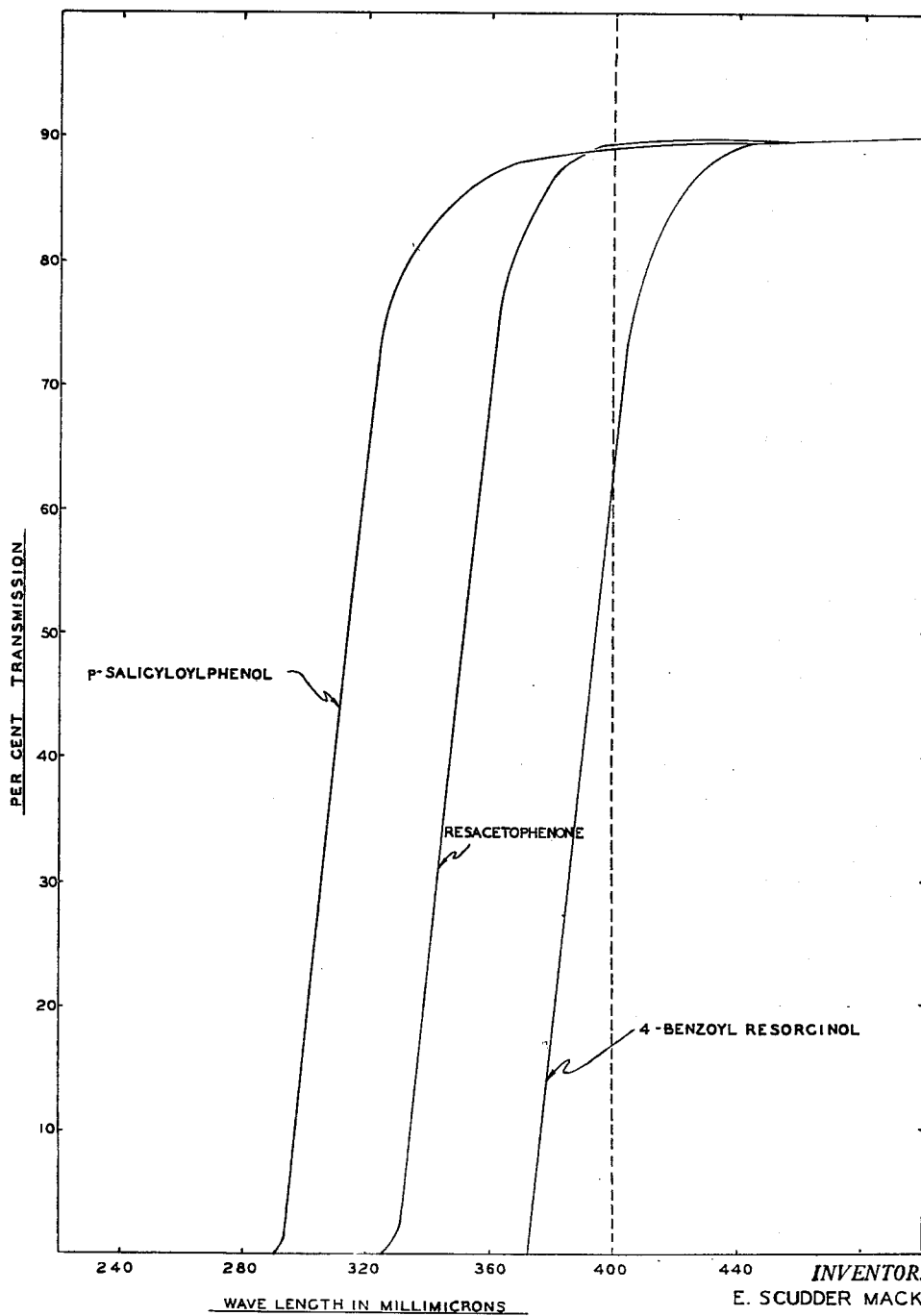
INVENTOR.
E. SCUDDER MACKEY
BY:
ATTORNEYS

UNITED STATES PATENT OFFICE 2,568,894

4-BENZOYLRESORCINOL AS AN ULTRA-VIOLET ABSORBENT

E. Scudder Mackey, Binghamton, N. Y., assignor to General Aniline & Film Corporation, New York, N. Y., a corporation of Delaware Application September 15, 1949, Serial No. 115,950

6 Claims. (Cl. 252—301.2)

This invention relates to an ultraviolet absorbing composition of matter adapted for protecting organic materials from degradation and discoloration by exposure to ultraviolet light.

It is known that many organic substances, except certain plants, foods of plant origin, such as cereals and legumes, are not entirely immune from the effects of ultraviolet light. Spoilage of fruits, edible oil, butter, and prepared or manufactured foods stored in glass containers is hastened by the effect of ultraviolet light rays in accelerating the development of oxidation and rancidity. Various colored objects, textiles, and dyed substances will fade when exposed for prolonged periods to the effect of sunlight. This appears to be particularly true of colored articles having relatively thin cross-sections, such as colored or dyed organic fibers, especially when they are subject to the effects of ultraviolet light.

It is also known that organic plastics, resins, film forming materials, and the like, become colored, brittle and eventually deteriorate when exposed to sunlight. Similarly, plastics prepared from polymeric vinylidene chloride have the same shortcomings. In order to vitiate the deleterious and damaging effect of sunlight upon these plastics and other materials, the incorporation of stabilizers, such as for example, resacetophenone (2,4-dihydroxyacetophenone), p-salicyloylphenol (2,4'-dihydroxybenzophenone), bis-p-hydroxyphenylketone (4,4 - dihydroxybenzophenone) and the like have been suggested by the prior art.

While the foregoing compounds inhibit the physical breakdown of the plastics and other materials in which they are incorporated, none of them is satisfactory as a protective material against ultraviolet fading. In other words, these compounds are not satisfactory as a protective material against ultraviolet light fading when employed in water-white or substantially colorless plastics, resins, film forming materials, colored textiles, color photographs and the like. In some cases the colorless plastics, resins, film forming materials, and color photographs coated with said materials containing these compounds become colored after several months and distort the color balance thereof. In other cases, slightly colored plastic or film forming material is itself discolored when exposed to ultraviolet light and in still other cases, the plastic or film forming medium offers no protection to the colored object because of its transmission of ultraviolet light.

It is, accordingly, an object of the present invention to provide an ultraviolet absorbing composition of matter comprising a light transmitting carrier having uniformly dispersed therein a selectively ultraviolet light absorbing agent.

A further object is to provide ultraviolet absorbing materials in the form of a transparent carrier medium having incorporated therein, in an anti-oxidizing amount, 4-benzoylresorcinol.

Other objects and features of the invention will appear hereinafter.

The above objects are attained by incorporating into any organic water-white or substantially colorless light transmitting carrier capable of fabrication into a film or foil, an ultraviolet absorbing amount of 4-benzoylresorcinol (2,4-dihydroxybenzophenone). This compound, as compared to related compounds proposed by the prior art, is unique in that it exhibits unusual ultraviolet absorbing properties when incorporated into said light transmitting carrier or composition without impairing the stability of the carrier or composition in which it is incorporated.

This compound is advantageously employed in a wide variety of carrier media which may comprise any organic material or composition which is water-white or substantially colorless, such as, for example, film forming plastics, resins, waxes, and the like. It may be incorporated into solutions or dopes of film forming materials by forming a solution of the 4-benzoylresorcinol in a suitable mutual solvent compatible with the dope, casting or otherwise treating this solution to form a sheet or foil and driving off the solvent. It may also be added to polymerizable organic materials which are capable of forming water-white or substantially colorless films or foils. In other words, the 4-benzoylresorcinol may be incorporated prior to the polymerization or copolymerization of such monomers as ethylene, styrene, nitroethylene, furfurylethylene, vinyl chloride, tetrafluoroethylene, vinyl esters, such as vinyl acetate, acrylic acid, α-substituted acylic acids and their derivatives, such as esters, amides, halides, and the like, or vinyl ketones, such as methyl vinyl ketones and the like.

The proportions of the 4-benzoylresorcinol which may be incorporated into the light transmitting carrier are not critical and the actual or desired proportions will depend upon the type of material employed. For practical purposes, I have found that the proportions of 4-benzoylresorcinol employed may range from 0.1% to 10%. The 4-benzoylresorcinol is mixed with the monomers in powder form or in solution in a suitable solvent prior to polymerization. Since the ultraviolet absorbent has substantially no accelerating effect, there is no need for adjustment of the polymerization conditions.

The compound may also be employed in paints, enamels, and varnishes to give protection against fading of dyes or pigments, in drying oils, in waxes, such as beeswax, candelilla wax, carnauba wax, cottonseed wax, etc., and polishing compositions containing the same, such as automobile polishes, floor waxes, and similar applications to protect the wax coating itself or the colored or dyed coated surface from degradation and discoloration. The quantity of the compound to be employed in such paints, lacquers, waxes and wax compositions may range from 5 to 15%. The actual amount, however, to be employed will depend, of course, upon the material or composition itself and can be very readily determined by simple trial experiments.

The compound may also be employed in a suitable light transmitting carrier for coating colored textiles, or uncolored textiles and fabrics to protect them against degradation of the fibers, paper or transparentized paper. It may also be dispersed in a lacquer or wax coating, and in transparent interlayer laminae in safety glass.

The ultraviolet absorbent of the present invention mixes readily with any type of material. If the material to which it is added is soluble in or compatible with organic solvents in general, the compound may be dissolved in alcohol, acetone, diacetone alcohol, and the like, and the solution thereof mixed with the material.

The 4-benzoylresorcinol is most advantageously introduced into the various substantially colorless resinous and film forming materials which are normally cast from solutions, extruded, or laminated into sheets, films, and foils such as urea-formaldehyde resins, phenol-formaldehyde resins, melamine-formaldehyde resins, polystyrene, nylon, oil-soluble phenolic resins, modified phenolic resins, rubber hydrochloride (Pliofilm), acrylates and methacrylates, polymers and copolymers of vinyl chloride, polymers of vinylidene chloride, polyvinyl acetate, polyvinyl butyral, partially hydrolized polyvinyl derivatives, cellulose organic esters, such as, for example, cellulose nitrate, cellulose acetate, cellulose propionate, cellulose butyrate, cellulose acetate-propionate, cellulose acetate-butyrate, and the like, cellulose ethers, such as, methyl cellulose, ethyl cellulose, propyl cellulose, benzyl cellulose and the like, cellophane (regenerated cellulose), acrylic resins and the like at the time the polymeric and copolymeric resinous or cellulosic ester or ether material is compounded preparatory to molding, extrusion, lamination, or casting from solution or dope form into films and foils.

The amount of 4-benzoylresorcinol to be employed in the foregoing materials is also not critical and the actual concentration to be employed may be very readily determined by a simple trial experiment. It will be appreciated that each type of material may require an amount which will differ from a closely analogous material. For practical purposes, I have found that the amount may range from 0.1% to 25% based on the dry weight of the plastic, resinous or film forming material. The actual amount employed will depend upon the thickness of such material. Films, filters, foils, and the like having a thickness ranging from 90 to 200 $\mu$ should contain, for best practical results, an amount ranging from 5 to 20% of 4-benzoylresorcinol based on the dry weight of the film forming material. The amount actually employed should be such that it increases as the thickness of the film forming material decreases within the aforestated range. In other words, the ultraviolet absorption of the film forming material may be controlled by adjusting either the thickness of the said material or the concentration of the 4-benzoylresorcinol. For example, films, foils, filters and the like, having a thickness of 90 $\mu$ and containing 15% of 4-benzoylresorcinol provide substantially the same ultraviolet absorption as a foil having a thickness of 140 $\mu$ and containing 10% of 4-benzoylresorcinol. 4-benzoylresorcinol is readily soluble in all of the organic solvents and plasticizers employed in compounding these film forming materials and is also soluble in the film forming material itself.

The various resins and plastic materials which contain the 4-benzoylresorcinol may be employed for the preparation of many commercial products where the transmission of light is an important factor. The resins and film forming materials, such as polyvinyl resins, polyvinyl acetal resins, mixed polyvinyl acetals, e. g., polyvinyl formaldehyde-acetaldehyde acetals, etc., containing the 4-benzoylresorcinol may be used as an intermediate layer in the making of laminated or safety glass. They may also be employed for making artificial yarn, lacquers, molding compositions, impregnated textiles, or laminated products. In some instances, it is desirable to mix these resins containing the 4-benzoylresorcinol with other plastic materials, such as cellulose esters and ethers, gums, and other resins, either natural or synthetic.

The following examples illustrate the practice of the present invention.

*Example I*

A lacquer containing 198 grams of acetone, 69 grams of butanol, 89 grams of methyl Cellosolve acetate, 10.5 grams of dibutyl phthalate, and 33.6 grams of cellulose acetate-butyrate was divided into four separate and equal portions. To each of the three separate portions, 0.84 gram of resacetophenone, 0.84 gram of p-salicyloylphenol and 0.84 gram of 4-benzoylresorcinol, dissolved in 5 cc. of acetone, were added. The remaining untreated portion was utilized as a blank for comparison.

Four identical color photographs of 5 x 7 size were coated with the untreated and treated lacquers, as above prepared, by spreading and allowing the solvent to evaporate so as to leave a film of about 0.003 inch thick. The coated photographs were exposed to concentrated ultraviolet light in a fadeometer for 46 hours. This exposure is equivalent to 12 days' sunlight exposure. The colored photograph, coated with the lacquer, containing no ultraviolet absorbent, was badly faded. The colored photographs coated with the lacquer, containing resacetophenone and p-salicyloylphenol, respectively, were also badly faded, whereas the photograph coated with the lacquer containing 4-benzoylresorcinol, showed very little fading and the brilliancy of the color record was practically unaffected.

*Example II*

To 80 grams of methyl ethyl ketone, 20 grams of vinyl chloride-vinyl acetate copolymer (90 parts of vinyl chloride and 10 parts of vinyl acetate), and 2 grams of 4-benzoylresorcinol were added, with stirring, until a solution was effectuated. By casting a sheet from this dope, a foil is obtained which may be used as an ultraviolet absorbing cover for colored materials.

*Example III*

To 130 cc. of ethyl acetate, 10 cc. of diacetone alcohol and 30 cc. of methanol, there were added 30 grams of polyvinyl butyral and 2.25 grams of benzoylresorcinol while stirring until a homogenous mixture was obtained. Upon casting this dope, a foil is obtained which may be used as an ultraviolet absorbing cover for colored material.

*Example IV*

To 175 cc. of methyl methacrylate monomer, there were added 50 mgs. of benzoyl peroxide and 0.2 gram of 4-benzoylresorcinol. The mixture was polymerized to a hard sheet of about $\frac{1}{32}$ of an inch thick in a heated mold. The resulting clear and colorless sheet may be used as a covering for colored photographs or as an ultraviolet absorbing filter over a camera lens.

*Example V*

150 grams of a dope containing 23% of cellulose acetate, 3% of triphenyl phosphate, and 74% of acetone were divided into three equal portions. To each separate portion 1.7 grams (approximately 5% based on the dry weight of the cellulose acetate) of p-salicyloylphenol, 1.7 grams of resacetophenone, and 1.7 grams of 4-benzoylresorcinol, respectively, dissolved in 15 cc. of acetone, were added and the dope stirred until a homogenous mixture was obtained.

Each mixture was cast on a glass plate by spreading and allowing the acetone to evaporate so as to leave a film of about 0.030 inch thick. After drying, the film foils were stripped and their transmission curves plotted as shown in the accompanying graph.

From this graph, it is readily seen that at 400 millimicrons, the critical wavelength which distinguishes the visible color region from the ultraviolet region, both the p-salicyloylphenol and the resacetophenone compounded foils, while transmitting 90% of the visible light, continue to transmit ultraviolet wavelengths far in excess of that permitted by the foil containing 4-benzoylresorcinol. This fact precludes the use of p-salicyloylphenol and resacetophenone foils as protective covers for colored photographs and textiles, since fading takes place. The use of 4-benzoylresorcinol, however, absorbs these color destroying ultraviolet wavelengths and precludes ultraviolet light fading.

*Example VI*

A mixture of 21 parts by weight of carnauba wax and 8 parts by weight of candelilla wax was heated until liquefaction occurred. 5 parts by weight of a condensation product of ethylene oxide and octadecanol, in which the ratio of ethylene oxide to octadecanol was approximately 2.5 to 1, was added to the melt with stirring. Gum turpentine was slowly added to the melt with stirring until a total of 63.3 parts by weight had been added. To the stirred melt was added 2.7 parts by weight of 4-benzoylresorcinol. The mixture was allowed to cool slowly with continued stirring until a slight solidification was noted, then the mixture was rapidly poured into a suitable chilled container. Upon rubbing a portion of the wax on a painted or enameled surface, a protective coating was formed which could be rubbed to a high gloss with a polishing rag. This formed an attractive protective film.

An added advantage of 4-benzoylresorcinol is that a film or foil containing it is colorless, absorbs very little of visible light, and, consequently, does not distort the color balance of the protected article. While both p-salicyloylphenol and resacetophenone are colorless and do not distort a colored article, they do not possess, however, the unique and excellent ultraviolet absorbing properties of 4-benzoylresorcinol.

This application is a continuation-in-part of my application Serial No. 58,616, filed November 5, 1948, and now abandoned.

By the term "light transmitting carrier" as used herein and in the appended claims is meant the various organic, plastic, resinous, or film forming materials disclosed heretofore.

While I have disclosed the preferred embodiments of my invention, it will be readily appreciated by those skilled in the art that many changes and variations may be made therein without departing from the spirit thereof. The scope of the invention is to be limited solely by the appended claims.

I claim:

1. An ultraviolet absorbing composition of matter comprising a light-transmitting carrier having uniformly dispersed therein 4-benzoylresorcinol.

2. An ultraviolet absorbing composition of matter comprising a light-transmitting carrier having uniformly dispersed therein, in ultraviolet absorbing amount, 4-benzoylresorcinol.

3. An ultraviolet absorbing composition of matter comprising a sheet of light-transmitting cellulosic plastic material having incorporated therein, in ultraviolet absorbing amount, 4-benzoylresorcinol.

4. An ultraviolet absorbing composition of matter comprising polyvinyl butyral having uniformly dispersed therein, in ultraviolet absorbing amount, 4-benzoylresorcinol.

5. An ultraviolet absorbing composition of matter comprising cellulose acetate having uniformly dispersed therein, in ultraviolet absorbing amount, 4-benzoylresorcinol.

6. An ultraviolet absorbing composition of matter comprising a polymer of methyl methacrylate having uniformly dispersed therein, in ultraviolet absorbing amount, 4-benzoylresorcinol.

E. SCUDDER MACKEY.

REFERENCES CITED

The following references are of record in the file of this patent:

UNITED STATES PATENTS

| Number | Name | Date |
| --- | --- | --- |
| 1,941,710 | Moss | Jan. 2, 1934 |
| 2,264,291 | Boyer | Dec. 2, 1941 |
| 2,393,794 | Meyer et al. | Jan. 29, 1946 |